US011533385B2

(12) United States Patent
Rose et al.

(10) Patent No.: US 11,533,385 B2
(45) Date of Patent: Dec. 20, 2022

(54) TRANSPORTATION VEHICLE FOR PROVIDING INFOTAINMENT CONTENT IN AREAS OF LIMITED COVERAGE

(71) Applicant: VOLKSWAGEN AKTIENGESELLSCHAFT, Wolfsburg (DE)

(72) Inventors: Jewgeni Rose, Braunschweig (DE); Simon Jordan, Braunschweig (DE); Fabian Galetzka, Wolfsburg (DE)

(73) Assignee: Volkswagen Aktiengesellschaft

( * ) Notice: Subject to any disclaimer, the term of this patent is extended or adjusted under 35 U.S.C. 154(b) by 111 days.

(21) Appl. No.: 16/904,339

(22) Filed: Jun. 17, 2020

(65) Prior Publication Data
US 2020/0404067 A1 Dec. 24, 2020

(30) Foreign Application Priority Data
Jun. 18, 2019 (DE) .................. 10 2019 208 861.9

(51) Int. Cl.
*G06F 15/167* (2006.01)
*H04L 67/5681* (2022.01)
*H04W 4/029* (2018.01)
*H04L 67/52* (2022.01)

(52) U.S. Cl.
CPC .......... *H04L 67/5681* (2022.05); *H04L 67/52* (2022.05); *H04W 4/029* (2018.02)

(58) Field of Classification Search
CPC ..... H04L 67/5681; H04L 67/52; H04L 67/12; H04W 4/029; H04W 4/02; H04W 4/025
See application file for complete search history.

(56) References Cited

U.S. PATENT DOCUMENTS

| 6,597,906 | B1 | 7/2003 | Van Leeuwen et al. |
| 9,247,523 | B1 * | 1/2016 | Bhatia ............ H04W 4/02 |
| 10,063,628 | B2 | 8/2018 | Krueger |
| 10,449,857 | B2 | 10/2019 | Wild et al. |
| 11,280,632 | B2 | 3/2022 | Pögel et al. |
| 2011/0167128 | A1 * | 7/2011 | Raghunathan ...... H04W 36/02 709/217 |

(Continued)

FOREIGN PATENT DOCUMENTS

| CN | 101819716 A | 9/2010 |
| CN | 104756073 A | 7/2015 |

(Continued)

OTHER PUBLICATIONS

Second Office Action; Chinese Patent Application No. 202010493803.0; dated Sep. 15, 2022.

*Primary Examiner* — Johnny B Aguiar
(74) *Attorney, Agent, or Firm* — Barnes & Thornburg LLP

(57) ABSTRACT

A method for providing a user of a transportation vehicle with infotainment content. An area of insufficient coverage of a network along a route ahead of the transportation vehicle is determined. Infotainment content to be made available to the user in the area of insufficient network coverage is determined based on at least one user input. This determined infotainment content to be provided is loaded into the transportation vehicle via the network and is finally made available to the user in the area of insufficient network coverage. A transportation vehicle to carry out the method and a system having a transportation vehicle and a network server.

12 Claims, 2 Drawing Sheets

(56) References Cited

U.S. PATENT DOCUMENTS

| | | | |
|---|---|---|---|
| 2011/0223880 A1 | 9/2011 | Lepejian et al. | |
| 2012/0008509 A1 | 1/2012 | Myers et al. | |
| 2012/0178376 A1* | 7/2012 | Jain | H04W 4/024 |
| | | | 455/67.11 |
| 2014/0257695 A1* | 9/2014 | Annapureddy | G01C 21/00 |
| | | | 701/537 |
| 2016/0021190 A1* | 1/2016 | Vuyyuru | H04W 4/50 |
| | | | 709/223 |
| 2016/0044129 A1* | 2/2016 | Bergmann | H04M 15/49 |
| | | | 455/406 |
| 2016/0112864 A1* | 4/2016 | Harber | H04L 67/2847 |
| | | | 455/432.3 |
| 2018/0007161 A1* | 1/2018 | Hwang | H04W 4/44 |

FOREIGN PATENT DOCUMENTS

| | | |
|---|---|---|
| CN | 105051670 A | 11/2015 |
| CN | 109074758 A | 12/2018 |
| DE | 102009026588 A1 | 12/2010 |
| EP | 2409547 A1 | 1/2012 |

\* cited by examiner

TRANSPORTATION VEHICLE FOR PROVIDING INFOTAINMENT CONTENT IN AREAS OF LIMITED COVERAGE

PRIORITY CLAIM

This patent application claims priority to German Patent Application No. 10 2019 208 861.9, filed 18 Jun. 2019, the disclosure of which is incorporated herein by reference in its entirety.

SUMMARY

Illustrative embodiments relate to a method for providing a user of a transportation vehicle with infotainment content, in particular, when driving through an area with insufficient network coverage. Illustrative embodiments also relate to a transportation vehicle configured to carry out the disclosed method and to a system comprising a transportation vehicle and a network server that is configured to carry out the disclosed method.

BRIEF DESCRIPTION OF THE DRAWINGS

Disclosed embodiments are explained below based on the associated drawings, in which.

DETAILED DESCRIPTION

Figure 1:
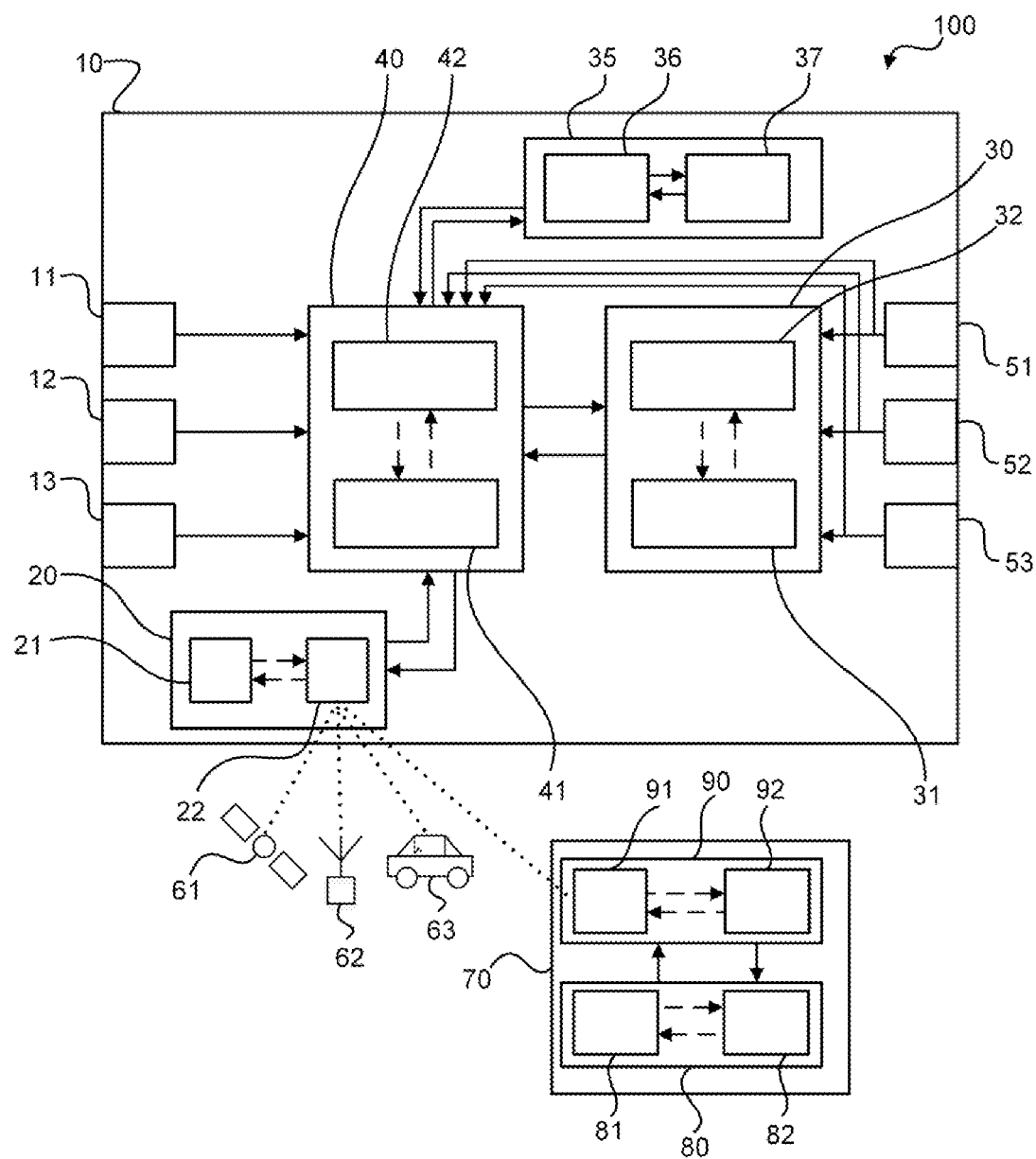
FIG. 1 shows a schematic illustration of an exemplary system comprising a disclosed transportation vehicle and a disclosed mobile network server in accordance with an exemplary embodiment.

Modern transportation vehicles already have a multiplicity of assistance systems which assist the driver in a computer-based manner in a multiplicity of driving situations. Such assistance systems can resort to sensors for capturing a multiplicity of items of measurement data which by far exceed the sensory skills of the person. In addition, the speed of these assistance systems significantly surpasses the human response time. Known driver assistance systems are, for example, lane departure assistants, braking assistants in the case of pedestrian detection and adaptive cruise control systems, in particular, for traffic jam situations.

As a result of the use of such assistance systems, the driver's autonomy with respect to his driving decisions increasingly passes over to the transportation vehicle or control units operating in the latter. At the end of these developments, there is an automatically driving transportation vehicle which can maneuver completely without intervention by a person. As a projection of driver assistance systems, this results in fully automated transport of people.

In addition, the focus is on assistance systems as a way for informing and entertaining (infotainment) the transportation vehicle users, in particular, since the users of an automatically driving transportation vehicle pay less attention to the actual driving task. The infotainment provided by an assistance system comprises in this case the audiovisual output of information, in particular, in response to specific user inputs.

In this case, the output can be effected as a voice assistance system which reacts to voice inputs by a user. Furthermore, audio and/or film files requested by the user can be output. Whereas such audio and film files in principle could still be locally stored in the transportation vehicle, the provision of information by a voice assistance system generally requires an existing network connection. The same applies to carrying out voice recognition and to the streaming of multimedia content.

The loss of a network connection, for example, as a result of driving through a "dead zone", therefore has hitherto generally resulted in restrictions in the provision of infotainment to a transportation vehicle user. In combination with an automatically driving transportation vehicle, such a loss of the network-related or interactive infotainment can result in a considerably poorer driving experience of a transportation vehicle user.

Disclosed embodiments overcome or at least reduce the drawbacks of the prior art and present a method for providing a transportation vehicle user with information, which improves the driving experience.

A first disclosed embodiment relates to a method for providing at least one user of a transportation vehicle, optionally a plurality of users of the transportation vehicle, with infotainment content. Within the scope of the present application, infotainment content may denote in this case multimedia content output to the user, for example, sounds, voice, music, images and/or image sequences. In this case, infotainment content may denote streamed audio and/or video files, for example, series, as well as audio data output by a voice assistance system. In other words, the infotainment content of the present method may be suitable for being output by at least one loudspeaker and/or screen.

In the disclosed method, an area with insufficient coverage of a network along a route ahead of the transportation vehicle is first of all determined. In this case, the route ahead of the transportation vehicle denotes a route yet to be traveled on by the transportation vehicle. The route ahead of the transportation vehicle may be determined on the basis of a route determined for and/or by the transportation vehicle. This may be a route which is determined by a navigation system and along which the transportation vehicle is currently moving. Alternatively, the route ahead of the transportation vehicle is determined solely on the basis of a transportation vehicle position, a transportation vehicle direction of movement and map material, for example, on freeways. In any case, the route ahead of the transportation vehicle defines those areas which will be driven through by the transportation vehicle in future, optionally areas which are driven through with at least a particular probability.

Within the scope of the present application, insufficient coverage of a network denotes the fact that the signal quality or bandwidth provided by a network is not sufficient to transmit infotainment content without errors. The network may be a network which is used by the transportation vehicle to download in infotainment content, in particular, a mobile radio network or a smart infrastructure such as a Wireless Local Area Network (WLAN), which enables a connection to a network server. A multiplicity of indicators of network coverage are known from the field of mobile radio, for example, a Channel State Indicator (CSI), Quality of Service (QoS) Class Identifier (QCI) and the like, and characterize a possible data throughput through the network.

In the sense of the present application, coverage of a network (network coverage) may be insufficient if a signal quality, bandwidth and/or the (possible) data throughput through the network respectively undershoot(s) a predetermined limit value. In this case, the limit value may be selected in such a manner that interference-free transmission of a wide range of infotainment content, in particular, multimedia content, for example, music or High Definition (HD) videos, is possible above the limit value. The limit value may likewise be selected in such a manner that, above the limit value, data streams of a voice recognition system can be transmitted without interference (and possibly in a bidirectional manner) between the transportation vehicle and a network server executing a voice recognition program. In this case, the limit values may be selected by a transportation vehicle manufacturer and are stored in a memory of the transportation vehicle. Alternatively, the limit values are selected by the operator of a network server and are stored in a memory of the network server.

In the disclosed method, infotainment content which is to be made available to the driver in the previously determined area of insufficient network coverage ahead of the transportation vehicle is also determined. In this case, this infotainment content is determined, in particular, on the basis of at least one user input. In other words, the determination of the infotainment content to be provided presupposes both the determination of an area of insufficient network coverage and at least one user input. In the disclosed method, at least one item of infotainment content can be unambiguously determined on the basis of the at least one user input. The specific configuration of the at least one user input is also explained in detail below for different forms of implementation. The infotainment content to be provided in this case generally does not have any content-related reference to the determined area of insufficient network coverage ahead of the transportation vehicle. Furthermore, the infotainment content is determined before driving through the area of insufficient network coverage.

In the disclosed method, the determined infotainment content, that is to say the infotainment content to be provided in the area of insufficient network coverage, is also loaded into the transportation vehicle via the network. The determined infotainment content is loaded before driving through the determined area of insufficient network coverage. The content may be loaded from a network server and via the network, for which insufficient network coverage has been determined, optionally via a mobile radio network and/or a WLAN network. Loading into the transportation vehicle denotes, in particular, the fact that the loaded infotainment content is stored in a data memory of the transportation vehicle. The loading of the determined infotainment content therefore goes beyond the streaming of the content.

As soon as the transportation vehicle enters the area of insufficient network coverage, the user may be provided with the loaded infotainment content in the disclosed method. In other words, the infotainment content stored in the memory of the transportation vehicle is played back or output to the user. Playback may be effected automatically, for example, as the continuous playback of infotainment content which was already being played back before driving through the determined area. The provision or the playback of the loaded infotainment content is likewise optionally dependent on an additional user input, for example, an additional voice command from the user.

The disclosed method makes it possible to play back infotainment content even in areas of insufficient network coverage, in which case the infotainment content is determined according to the user's preferences, in particular, on the basis of at least one user input by the user. A constant driving experience is therefore made possible for the user irrespective of the network coverage along the route used by virtue of the interruption-free playback of infotainment content. In the disclosed method, the user therefore does not notice at all when an area of insufficient network coverage is being driven through or is at least prepared for this.

In at least one exemplary embodiment of the disclosed method, a notification relating to the determined area of insufficient network coverage is also output to a user of the transportation vehicle. The user is therefore informed of the upcoming area of insufficient network coverage. The notification is effected via at least one output methods or mechanisms of the transportation vehicle, optionally by outputting a voice message from a voice assistant or by output via at least one screen of the transportation vehicle. The driver is therefore informed of the imminent area of insufficient network coverage. In response to the notification, the at least one user input by the user for determining the infotainment content to be provided is received from the user. The user input is received via at least one input methods or mechanisms of the transportation vehicle, optionally as a voice input by the user via at least one microphone of the transportation vehicle. Alternatively, the user input may be effected via at least one touchscreen of the transportation vehicle.

According to this form of implementation, the user is informed, by the notification relating to the determined area of insufficient network coverage, of the fact that the provision of infotainment content is available only to a limited extent in this area. The notification may contain an item of information stating that particular infotainment content, for example, video files, or particular services, for example, voice assistance systems, are available only to a limited extent in the area of insufficient network coverage. The notification may also contain an indication of the extent of the area of insufficient network coverage, with the result that the user is also informed of how long a restriction can be expected for when providing infotainment content. In this case, the indication of the extent can be an indication of a length of the area or, for example, on the basis of a current (average) speed of the transportation vehicle, an indication of a time needed to drive through the area.

According to this form of implementation, the at least one user input, on the basis of which the infotainment content to be provided is determined, is provided by the user in response to and therefore with knowledge of the area of insufficient network coverage. The user can therefore use the user input to specify one or more items of infotainment content which are to be provided in the area of insufficient network coverage. The notification relating to the area of insufficient network coverage may contain at least one input request to specify desired infotainment content. The user can therefore specify, in response to the notification, which infotainment content, for example, current messages, podcasts or videos etc., is to be provided in the determined area of insufficient network coverage. According to this form of implementation, the infotainment content specified by the user, in particular, in response to the notification, may be loaded into the transportation vehicle and is made available to the user in the determined area of insufficient network coverage.

In exemplary embodiment of the disclosed method, the at least one user input relates to infotainment content made available to the user in the current driving situation. Infotainment content made available to the user in the current driving situation may be infotainment content which is actually currently being played back to the user, in which case infotainment content is inevitably currently played back in response to the reception of a corresponding user input. Infotainment content made available to the user in the current driving situation may likewise be infotainment content regularly played back to the user in the current driving situation. Past user inputs in comparable driving situations, in particular, similar or identical driving situations, are therefore used to determine the infotainment content to be provided.

If infotainment content made available to the user in the current driving situation is infotainment content which is actually currently being played back to the user, for example, a podcast which is currently being played back, a video which is currently being played back etc., an upcoming section of the infotainment content currently being played back is loaded, in response to the determination of the area of insufficient network coverage and taking into account a user input on which the current playback is based, before driving through the determined area. The current playback of the infotainment content can therefore be seamlessly continued in this area.

If infotainment content made available to the user in the current driving situation is infotainment content which is regularly played back to the user in the current driving situation, a current driving situation and/or a current driving context is/are first of all determined in response to the determination of the area of insufficient network coverage. In this case, the driving situation denotes the environment driven through, for example, whether a freeway journey, a highway journey or an urban journey is currently being effected. In addition, the driving context denotes further factors, in particular, the number and possibly the identity of the users in the transportation vehicle. On the basis of the determined driving situation and/or the determined driving context, infotainment content which is regularly played back in this driving situation and/or this driving context is also determined. This infotainment content which is regularly played back is then loaded and is provided in the determined area.

In one exemplary form of implementation, it is determined that the transportation vehicle is on the freeway and children are sitting on the back seat. If particular infotainment content was regularly played back to the children in such a situation in the past, for example, a television (TV) program, this infotainment content is determined as the infotainment content to be provided. According to a further exemplary form of implementation, it is determined that the driver is carrying out an urban journey to his workplace and is alone in the transportation vehicle. If the driver regularly listens to a news podcast in this situation, this podcast is determined as the infotainment content to be provided.

This exemplary embodiment of the disclosed method based on the current driving situation requires the use of a database to store information relating to infotainment content regularly played back in a particular driving situation and/or in a particular driving context. The storage of such information, for example, as a database-based user profile, is readily possible for a person skilled in the art. In the disclosed method, the method operation of determining a current driving situation and/or a current driving context of the transportation vehicle may be carried out. Furthermore, at least one user input is loaded from the database on the basis of the determined driving situation and/or on the basis of the determined driving context. As explained above, infotainment content regularly consumed by a user in particular situations can be stored in a database. The respective playback of the infotainment content in these situations means is or was respectively associated with a corresponding user input. In response to the determination of the current driving situation and/or the current driving context, at least one user input corresponding to the determined driving situation and/or to the determined driving context may be loaded from a database. The infotainment content to be provided is then determined on the basis of the loaded user input, as explained above.

In an exemplary embodiment of the disclosed method, the infotainment content to be provided comprises a section of the determined infotainment content corresponding to the extent of the area of insufficient network coverage. In this case, the determined infotainment content is the infotainment content determined on the basis of the at least one user input. Of this determined infotainment content, so much content is loaded in the disclosed method that it is possible to play back the infotainment content without interference and interruption in the area of insufficient network coverage. For example, infotainment content currently or regularly consumed by the user in a particular driving situation is loaded (buffered) to such an extent that interference-free playback is possible. Infotainment content specified by the user in response to the notification explained above by virtue of a corresponding user input may likewise be loaded only to such an extent that it can be played back without interruption in the determined area.

In a disclosed embodiment, the area of insufficient network coverage is determined on the basis of a route used by the transportation vehicle or on the basis of a current position and a direction of travel of the transportation vehicle. This information may be used in the disclosed method to determine an area of insufficient network coverage by a map of the network coverage. Such maps of the network coverage are provided by network operators, for example, or may be available in the transportation vehicle itself or in the network server. Alternatively, a map of the network coverage is generated on the basis of a multiplicity of measurements by the fleet transportation vehicles themselves and can be available in the network server, for example. The transportation vehicle likewise may receive at least one message relating to the network coverage from at least one other transportation vehicle, for example, via car-to-car (C2C) communication, and determines the area of insufficient network coverage on the basis of the at least one message.

The area of insufficient network coverage can be determined both by the transportation vehicle and by a network server. The network server may be the same network server which also provides the infotainment content. However, it may likewise also be another network server. The manner in which the area of insufficient network coverage is determined is possibly dependent on whether the determination is carried out by the transportation vehicle or a network server. For example, C2C communication is not received by the network server.

The disclosed method can be implemented by electrical or electronic parts or components (hardware) or by firmware including Application Specific Integrated Circuits (ASIC) or can be realized when executing a suitable program (software). The disclosed method is likewise realized or implemented by a combination of hardware, firmware and/or software. For example, individual components for carrying out individual method operations are a separately integrated circuit or are arranged on a common integrated circuit. Individual components configured to carry out individual method operations may also be arranged on a (Flexible) Printed Circuit Board (FPCB/PCB), a tape carrier package (TCP) or another substrate.

The individual method operations of the disclosed method may also be one or more processes which run on one or more processors in one or more electronic computing devices and are generated when executing one or more computer programs. In this case, the computing devices may be designed to cooperate with other components, for example, a communication module, and one or more sensors or cameras to implement the functionalities described herein. In this case, the instructions of the computer programs may be stored in a memory, for example, a Random Access Memory (RAM) element. However, the computer programs may also be stored in a non-volatile storage medium, for example, a Compact Disk Read-Only Memory (CD-ROM), a flash memory or the like.

It is also clear to a person skilled in the art that the functionalities of a plurality of computers (data processing devices) can be combined or can be combined in a single device or that the functionality of a particular data processing device can be distributed among a multiplicity of devices to carry out the operations of the exemplary method without departing from the disclosed method.

A further disclosed embodiment relates to a transportation vehicle, in particular, a transportation vehicle having an internal combustion engine, an electric motor or a hybrid motor. The disclosed transportation vehicle has a first communication module configured to communicate with a network server and with a Global Positioning System (GPS) satellite. The first communication module may be configured to communicate with further apparatuses, for example, further transportation vehicles or a smart infrastructure. The communication module optionally has a radio, mobile radio, WLAN and/or BLUETOOTH® transceiver or alternative wireless communication devices. The transportation vehicle also has a first control unit, wherein the control unit is configured to carry out the disclosed method.

The first control unit is configured, in particular, to determine an area of insufficient network coverage. This is carried out either by the transportation vehicle alone, possibly in communication with the first communication module, or by the transportation vehicle in communication with the network server. The control unit is also configured to determine infotainment content to be provided in the determined area on the basis of at least one user input. This may be effected using at least one user interface of the transportation vehicle having at least one input method or mechanism for outputting a notification relating to the determined area of insufficient network coverage and having at least one input method or mechanism for receiving at least one user input.

Alternatively, the first control unit may be designed to transmit position and/or route information relating to the transportation vehicle to a network server using the first communication module and, in response, to receive information relating to an area of insufficient network coverage ahead of the transportation vehicle from the network server. The control unit may likewise be designed to transmit information relating to at least one user input or information relating to a current driving situation and/or a current driving context to a network server using the first communication module and, in response, to receive information relating to infotainment content to be provided from the network server.

The first control unit is also designed to load the infotainment content, which is to be provided and is determined by the first control unit or is identified by the network server, from the network server using the first communication module and to store the content in a memory arranged in the transportation vehicle. The control unit is also designed to provide or play back the loaded infotainment content to be provided to a user via the at least one user interface when driving through the determined area of insufficient network coverage.

The transportation vehicle may have at least one first sensor configured to capture environmental data and at least one second sensor configured to capture transportation vehicle data. In this case, the at least one first sensor is designed to capture sensor signals relating to the environment of the transportation vehicle, for example, with respect to a current driving situation. In this case, the at least one second sensor is designed to capture sensor signals relating to the transportation vehicle itself, for example, with respect to a current driving context. In this case, an environmental signal received by the at least one first sensor may enable the transportation vehicle to be informed of its environment and may represent a multiplicity of items of environmental information. A state signal received by the at least one second sensor may enable the transportation vehicle to be informed of its own state and may represent a multiplicity of items of state information. For example, the first sensors have a camera for capturing an image of the transportation vehicle environment and the second sensors have at least one pressure sensor for capturing the seat occupancy of the transportation vehicle.

The first control unit of the disclosed transportation vehicle may be configured to communicate with the at least one first sensor, with the at least one second sensor and with the first communication module of the transportation vehicle. Disclosed embodiments of the transportation vehicle also correspond to the exemplary method explained above.

In an exemplary embodiment, the disclosed transportation vehicle has a driving system configured to automatically drive the transportation vehicle. The driving system of the disclosed transportation vehicle may be configured to carry out at least one automatic driving maneuver/an automatic journey of the transportation vehicle. The driving system may be designed to drive the transportation vehicle in a completely automatic manner and can control the longitudinal guidance and the lateral guidance of the transportation vehicle. The driving system may also access the at least one first sensor and/or the at least one second sensor to determine state information and/or environmental information relating to the transportation vehicle.

A further disclosed embodiment relates to a first computer program comprising instructions which, when the program is executed by a computer, for example, a control unit of a transportation vehicle, cause it to carry out the operations of the transportation vehicle in the disclosed method, in particular, the operations of determining an area of insufficient coverage of a network along a route ahead of the transportation vehicle, determining infotainment content to be made available to the user in the area of insufficient network coverage on the basis of at least one user input, loading the determined infotainment content into the transportation vehicle via the network, and making the loaded infotainment content available to the user in the area of insufficient network coverage. The area of insufficient network coverage and the infotainment content to be provided are determined in this case solely by the transportation vehicle or the first control unit or else by a network server which receives information required for this purpose from the transportation vehicle and transmits the results. Disclosed embodiments of the first computer program correspond to the forms of implementation explained with reference to the disclosed method.

A further disclosed embodiment relates to a system for carrying out the disclosed method comprising a disclosed transportation vehicle and a network server. In this case, the network server has a second communication module configured for data communication with a plurality of transportation vehicles and a second control unit. In this case, the second control unit is configured to transmit infotainment content requested by the transportation vehicle to the transportation vehicle using the second communication module. In this case, the network server may be designed to transmit the infotainment content to the transportation vehicle via a network. The infotainment content may be multimedia content or data streams of a voice recognition application, for example, a voice assistant. The network server may likewise be designed to execute a voice recognition application.

According to at least one exemplary embodiment of the disclosed system, the network server is also designed to carry out further operations of the disclosed method. According to a first disclosed embodiment, the network server, in particular, its second control unit, using the second communication module, is designed to receive position and/or route information from the transportation vehicle. The network server (the second control unit) is also designed to determine the area of insufficient network coverage ahead of the transportation vehicle on the basis of this received information and on the basis of information relating to the network coverage which is available in the network server, for example, as a map of the network coverage. According to this disclosed embodiment, the network server is also designed to transmit information relating to the determined area to the transportation vehicle.

Alternatively or additionally, the network server, in particular, its second control unit, using the second communication module, is designed to receive the at least one user input. The user input is, for example, a user input made by the user in response to a notification containing an input request for the purpose of identifying at least one item of infotainment content to be provided. The network server, in particular, its second control unit, using the second communication module, may likewise be designed to receive information relating to a current driving situation and/or relating to a current driving context from the transportation vehicle. In this disclosed embodiment, the network server is also designed to load at least one user input corresponding to the current driving situation and/or to the current driving context from a database on the basis of this received information. In this case, the database is created in the network server and links driving situations and/or driving contexts to infotainment content regularly consumed by a user in these driving situations and/or driving contexts and to user inputs corresponding to the infotainment content.

The network server is also designed to determine the infotainment content to be made available to the user in the area of insufficient network coverage on the basis of the at least one received or determined user input from the user of a transportation vehicle. In this case, the network server may take into account the extent of the area of insufficient network coverage, in particular, by determining the infotainment content to be provided using a length corresponding to the determined area of insufficient network coverage. The infotainment content may be retrieved from a memory of the network server or possibly from a further (content) network server. The network server is also designed to transmit the determined infotainment content to be provided to the transportation vehicle, with the result that this content can be locally stored there. Disclosed embodiments of the network server correspond to the forms of implementation explained with reference to the disclosed method.

A further exemplary embodiment relates to a second computer program comprising instructions which, when the program is executed by a computer, for example, a control unit of a network server, cause it to carry out the operations of the network server in the disclosed method, in particular, determining an area of insufficient coverage of a network on the basis of position and/or route information received from a transportation vehicle, receiving at least one user input from the transportation vehicle or determining at least one user input on the basis of a current driving situation received from the transportation vehicle and/or a current driving context of the transportation vehicle received from the transportation vehicle, and/or determining the infotainment content to be made available to the user in the area of insufficient network coverage on the basis of the at least one user input, and also the operation of transmitting infotainment content requested by the transportation vehicle to the transportation vehicle. Disclosed embodiments of the second computer program correspond to the forms of implementation explained with reference to the disclosed method.

The different disclosed embodiments which are mentioned in this application can be combined with one another, unless stated otherwise in the individual case.

FIG. 1 shows a schematic illustration, in particular, a block diagram, of an exemplary transportation vehicle 10, in particular, a two-track transportation vehicle with an internal combustion engine, an electric motor or a hybrid motor. The transportation vehicle 10 comprises a multiplicity of first sensors, in particular, a first sensor 11, a second sensor 12 and a third sensor 13. The first sensors 11, 12, 13 are configured to capture environmental data relating to the transportation vehicle 10 and comprise, for example, a camera for capturing an image of an environment immediately surrounding the transportation vehicle 10, distance sensors, for example, ultrasonic sensors or Light Detection and Ranging (LIDAR), for capturing distances to objects surrounding the transportation vehicle 10. The first sensors 11, 12, 13 transmit the environmental signals captured by them to a first control unit 40 of the transportation vehicle 10.

The transportation vehicle 10 also has a plurality of second sensors, in particular, a fourth sensor 51, a fifth sensor 52 and a sixth sensor 53. The second sensors 51, 52, 53 are sensors for determining state data relating to the transportation vehicle 10 itself, for example, current position and movement information relating to the transportation vehicle. The second sensors are consequently, for example, speed sensors, acceleration sensors, inclination sensors, sensors for measuring a penetration depth of a shock absorber, wheel speed sensors or the like. The second sensors 51, 52, 53 transmit the state signals captured by them to the first control unit 40 of the transportation vehicle 10. The second sensors 51, 52, 53 also transmit their measurement results directly to a driving system 30 of the transportation vehicle 10.

The transportation vehicle 10 also has a first communication module 20 having a memory 21 and one or more transponders or transceivers 22. The transponders 22 are a radio, WLAN, GPS or BLUETOOTH® transceiver or the like. The transponder 22 communicates with the internal memory 21 of the first communication module 20, for example, via a suitable data bus. The current position of the transportation vehicle 10, for example, can be determined by the transponder 22 by communicating with a GPS satellite 61 and this position can be stored in the internal memory 21.

The first communication module 20 also communicates with the first control unit 40. In addition, the first communication module 20 is configured to communicate with a mobile network server 70, in particular, a back-end server belonging to a transportation vehicle manufacturer, a contractual partner or a fleet operator. In this case, communication is effected, in particular, using a second communication module 90 of the network server 70. The first communication module 20 may be configured to communicate via a mobile radio network, for example, a fourth-generation wireless (4G) or fifth-generation wireless (5G) mobile radio network. The communication module 20 is also designed to determine a signal strength of the mobile radio network. The determined signal strengths may be linked to a position of the transportation vehicle 10, for example, a GPS position of the transportation vehicle 10.

The transportation vehicle 10 also has the driving system 30 which is configured for the completely automatic driving mode, in particular, for the longitudinal and lateral guidance, of the transportation vehicle 10. The driving system 30 has a navigation module 32 which is configured to calculate routes between a starting point and a destination and to determine the maneuvers to be carried out by the transportation vehicle 10 along this route. In addition, the driving system 30 comprises an internal memory 31, for example, for map materials, which communicates with the navigation module 32, for example, via a suitable data bus. The driving system 30 also communicates with the control unit 40 and receives trajectory information received by the network server 70 from the control unit 40 by the first communication module 20. The navigation module 32 may be configured to determine a route of the transportation vehicle 10 on the basis of this trajectory information.

At least some of the second sensors 51, 52, 53 of the transportation vehicle 10 transmit their measurement results directly to the driving system 30. These data transmitted directly to the driving system 30 are, in particular, current position and movement information relating to the transportation vehicle. These data are may be captured by speed sensors, acceleration sensors, inclination sensors, etc.

The transportation vehicle 10 also has a first control unit 40 which is configured to carry out the operations of the exemplary transportation vehicle 10 in the disclosed method. For this purpose, the first control unit 40 has an internal memory 41 and a Central Processing Unit (CPU) 42 which communicate with one another, for example, via a suitable data bus. In addition, the first control unit 40 has a communication connection to at least the first sensors 11, 12, 13, the second sensors 51, 52, 53, the first communication module 20 and the driving system 30, for example, via one or more respective Content Addressable Network (CAN) connections, one or more respective Serial Peripheral Interface (SPI) connections or other suitable data connections.

The transportation vehicle 10 also has at least one user interface 35 which enables interaction between at least one user 1 (See FIG. 3) of the transportation vehicle 10 and the transportation vehicle 10, in particular, its control unit 40. For this purpose, the user interface has at least one input method or mechanism 35 for receiving user inputs and at least one output method or mechanism 37 for outputting information to a user. The at least one input method or mechanism has at least one microphone for capturing a voice input by a user and a module for voice recognition. In this case, the module for voice recognition may be part of the input method or mechanism 36 or of the control unit 40. The at least one input method or mechanism 36 may also comprise a touchscreen or the like. The at least one output method or mechanism 37 has at least one loudspeaker and a module for voice output. In this case, the module for voice output may be part of the output method or mechanism 37 or of the control unit 40. The at least one output method or mechanism 37 may also comprise a screen.

The network server 70 has a second control unit 80 which is configured to carry out the operations of the network server 70 in the disclosed method. For this purpose, the second control unit 80 has an internal memory 81 and a CPU 82 which communicate with one another, for example, via a suitable data bus. The network server 70 also has a second communication module 90. The second communication module 90 has a memory 92 and one or more transponders or transceivers 91. The transponders 91 are a radio, WLAN, GPS or BLUETOOTH® transceiver or the like. The transponder 91 communicates with the internal memory 92 of the second communication module 90, for example, via a suitable data bus. The second communication module 90 may be configured to communicate via a Long Term Evolution (LTE) mobile radio network.

Figure 2:
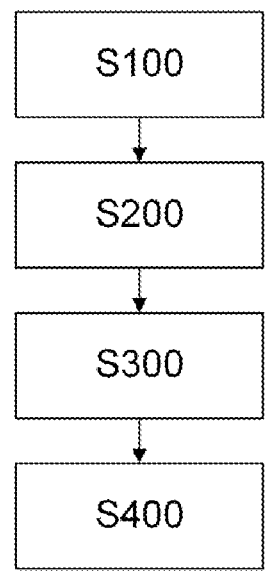
FIG. 2 shows a schematic illustration of an exemplary method in accordance with an implementation.

FIG. 2 shows a schematic flowchart of a disclosed method which is carried out by the disclosed system 100. The disclosed method has substantially the following method operations which are carried out by the transportation vehicle 10, by the network server 70 or by the system 100 comprising the transportation vehicle 10 and the network server 70. In a first operation at S100 of the disclosed method, an area with insufficient coverage by a network along a route ahead of the transportation vehicle is first of all determined. In a next operation at S200, infotainment content to be made available to the user in the area of insufficient network coverage is also determined on the basis of at least one user input. In an operation at S300, the determined infotainment content is transmitted to the transportation vehicle 10 or is loaded into the transportation vehicle via the network. Finally, in an operation at S400, the loaded infotainment content is made available to the user in the area of insufficient network coverage.

As stated, the operations of the disclosed method are carried out completely by the transportation vehicle 10 or partially by a network server 70 in this case. For forms of implementation of the disclosed method, FIG. 3 shows a schematic illustration of the communication between a network server 70, transportation vehicles 10, 10' according to the disclosed embodiments and a user during the method.

Figure 3:
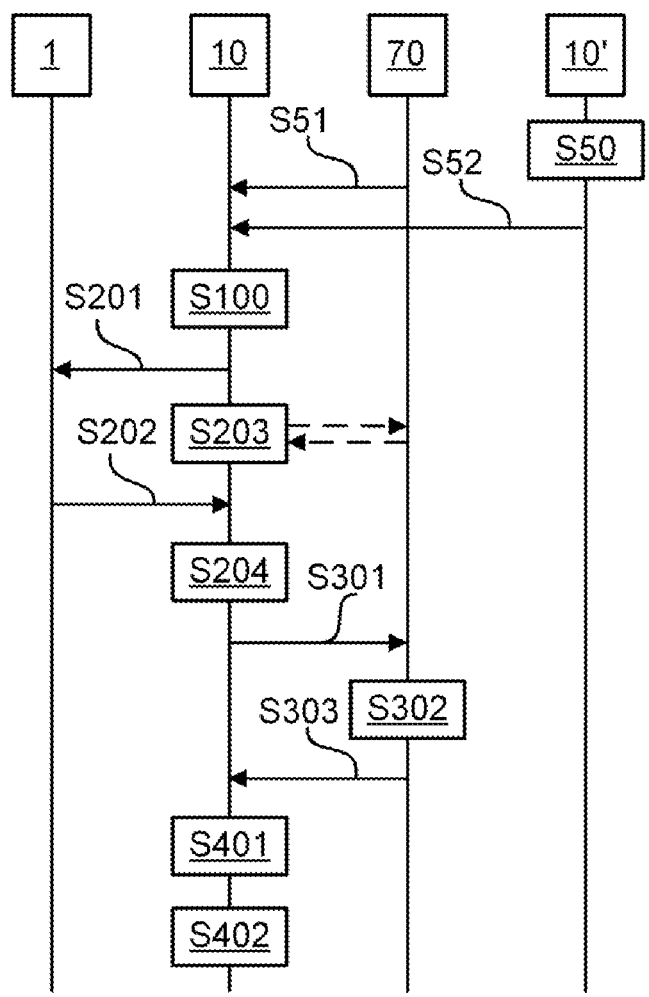
FIG. 3 shows a schematic illustration of the communication between a disclosed network server, disclosed transportation vehicles and a user in the disclosed method.

The method schematically illustrated in FIG. 3 is used to provide a user 1 of the transportation vehicle 10 with infotainment content in a disclosed method. The method is carried out in the system 100 which is illustrated in FIG. 1 and, in addition to the transportation vehicle 10, also has a further transportation vehicle 10', 63.

In the method illustrated in FIG. 3, an area of insufficient network coverage is first of all determined. For this purpose, the transportation vehicle 10 receives information relating to network coverage from a network server 70 in an operation at S51. This information is determined by the network server 70 on the basis of a map of the network coverage from a network operator and/or on the basis of information relating to the network coverage which is determined by other transportation vehicles 10 and is transmitted to the network server 70. For example, the network server 70 is a network server 70 belonging to a fleet operator which receives network coverage values measured by all fleet transportation vehicles and creates its own map of the network coverage on the basis of the values.

In an operation at S52, the transportation vehicle 10 additionally receives a message relating to network coverage from a further transportation vehicle 10' via car-2-car communication. The transportation vehicle 10' previously carried out a measurement of network coverage at a first position in an operation at S50, which revealed that network coverage is insufficient at the first position. The result of this measurement, in particular, the information relating to the insufficient network coverage at the first position, is transmitted by the transportation vehicle 10' to the transportation vehicle 10 in operation at S52, optionally within a first area. The transportation vehicle 10' is, for example, a transportation vehicle which is approaching the transportation vehicle 10 and has already driven through an area ahead of the transportation vehicle 10.

On the basis of the information received in operations at S51 and S52, the transportation vehicle 10 finally determines, in operation at S100, the area with insufficient network coverage which is ahead of the transportation vehicle 10 along its route. In this case, the area is determined, in particular, as at least one GPS coordinate. The area may be determined as at least one GPS coordinate with a radius around the GPS coordinate. The transportation vehicle 10 also determines the area of insufficient network coverage in operation at S100 with regard to particular limit values, that is to say with regard to particular infotainment content which is not available in the determined area.

In a next operation at S201, the transportation vehicle 10 outputs a notification to a user 1 of the transportation vehicle 10, which notification informs the user of the determined area of insufficient network coverage. The notification informs the user 1 of the time until the arrival in the determined area and the extent of the determined area, with the result that the user knows the length of time for which a restriction of network-based functionalities can be expected. The notification in operation at S201 also contains an input request to specify at least one item of infotainment content which is desired by the user 1 within the determined area and is therefore to be provided by the transportation vehicle 10. In this case, the notification is output via the output method or mechanism 37 of the user interface 35. In operation at S202, the user 1 inputs a user input via the input method or mechanism 36 of the user interface 35. In this case, the user input identifies a podcast as the infotainment content desired by the user 1 in the area of insufficient network coverage.

In an operation at S203, the transportation vehicle 10 also determines a user input in a parallel manner on the basis of a current driving situation and a current driving context of the transportation vehicle 10. In this case, the current driving situation and the current driving context of the transportation vehicle 10 are first of all determined. According to FIG. 3, the transportation vehicle 10 is on a freeway journey and there are children on the back seat. The transportation vehicle 10 transmits information relating to this current driving situation and this driving context to the network server 70, as indicated by a dashed arrow. The network server then determines that the children have regularly retrieved particular infotainment content, namely a particular children's program from a TV station, in identical driving situations with an identical driving context. In other words, for the driving situation and the driving context, the network server 70 determines the user inputs previously made by the children or their parents to retrieve this children's program. The network server 70 transmits this user input to the transportation vehicle 10, as likewise indicated.

In operation at S204, the transportation vehicle 10 determines the infotainment content to be provided in the area of insufficient network coverage on the basis of the available information. The transportation vehicle 10 determines that a particular podcast should be provided for the user 1 in the area of insufficient network coverage on the basis of the user input received via the user interface 37. The transportation vehicle 10 also transmits the fact that a children's program should be provided for the children on the back seat. The transportation vehicle additionally checks whether infotainment content is currently being played back in the transportation vehicle 10 and whether a remaining length of this content exceeds a time until arriving at the area of insufficient network coverage. If this is the case, the transportation vehicle 10 also determines that the content currently being played back should be preloaded for seamless playback in the area of insufficient network coverage.

In operation at S301, the transportation vehicle 10 transmits information relating to the determined infotainment content to be provided to the network server 70. This network server 70 loads this infotainment content from an internal memory or possibly from another server in operation at S302. In an operation at S303, the network server 70 transmits the infotainment content to be provided to the transportation vehicle 10. In this case, the network server 70 uses the network for which the upcoming area of insufficient network coverage has been determined by the transportation vehicle 10.

The transportation vehicle 10 receives the infotainment content to be provided in operation at S303 and stores the content in an internal memory in operation at S401. Operations at S303 and S401 may be carried out in this case before entering the area of insufficient network coverage, which is effected immediately after operation at S401. In operation at S402, the transportation vehicle 10 is therefore already in the area of insufficient network coverage. In this operation at S402, the determined infotainment content which is to be provided, has been loaded into the transportation vehicle and stored there is finally made available to the users. The desired podcast is played back to the user 1 and the children's program which is conventional for the freeway journeys is played back to the children on the back seat of the transportation vehicle 10.

LIST OF REFERENCE SIGNS

10 Transportation vehicle
11 First sensor
12 Second sensor
13 Third sensor
20 Communication module
21 Memory
22 Transponder
30 Driving system
31 Memory
32 Navigation module
35 User interface
36 Input method or mechanism
37 Output method or mechanism
40 Control unit
41 Memory
42 CPU
51 Fourth sensor
52 Fifth sensor
53 Sixth sensor
61 Satellite
62 Base station
63 Other transportation vehicle
70 Network server
80 Control unit 81 Memory
82 CPU
90 Communication module
91 Transponder
92 Memory
100 System

The invention claimed is:

1. A transportation vehicle comprising:
a first communication module configured to communicate with a network server; and
a first control unit configured to provide a user of the transportation vehicle with infotainment content, wherein the first control unit:
determines an area of insufficient coverage of a network along a route ahead of the transportation vehicle;
determines the infotainment content to be made available to the user in the area of insufficient network coverage based on at least one user input;
loads the determined infotainment content into the transportation vehicle via the network; and
makes the loaded infotainment content available to the user in the area of insufficient network coverage, and further makes loaded infotainment content available to rear seat passengers of the transportation vehicle;
wherein a section of the determined infotainment content corresponding to an extent of the area of insufficient network coverage is loaded,
wherein the determined infotainment content is played back without interference and interruption in the area of insufficient network coverage,
wherein the area of insufficient network coverage is determined based on a route used by the transportation vehicle, a map of network coverage, and a message relating to the network coverage received from at least one other transportation vehicle, and
wherein the loaded infotainment content available to the rear seat passengers is determined based on content regularly played to the rear seat passengers in the transportation vehicle according to a driving situation, the driving situation determined according to the transportation vehicle's location and estimated length of journey.

2. The transportation vehicle of claim 1, wherein the first control unit is configured to control output a notification relating to the area of insufficient network coverage, and to control receipt of the at least one user input in response to the notification.

3. The transportation vehicle of claim 2, wherein the notification has at least one input request to specify desired infotainment content and/or an indication of the extent of the area of insufficient network coverage.

4. The transportation vehicle of claim 1, wherein the at least one user input relates to the infotainment content provided in a current driving situation.

5. The transportation vehicle of claim 1, wherein the first control unit is configured to control determination of a current driving context of the transportation vehicle, and loading the at least one user input from a database based on the determined driving context of the transportation vehicle.

6. A system comprising the transportation vehicle of claim 1 and the network server having a second communication module for data communication with a plurality of transportation vehicles and a second control unit to transmit the infotainment content requested by the transportation vehicle to the transportation vehicle.

7. The system of claim 6, wherein the network server:
determines the area of insufficient coverage of the network based on position and/or route information received from the transportation vehicle;
receives the at least one user input from the transportation vehicle or determines the at least one user input based on a current driving situation and/or driving context of the transportation vehicle received from the transportation vehicle; and/or
determines the infotainment content to be made available to the user in the area of insufficient network coverage based on the at least one user input.

8. A method for providing a user of a transportation vehicle with infotainment content, the method comprising:
determining an area of insufficient coverage of a network along a route ahead of the transportation vehicle;
determining the infotainment content to be made available to the user in the area of insufficient network coverage based on at least one user input;
loading the determined infotainment content into the transportation vehicle via the network; and
making the loaded infotainment content available to the user in the area of insufficient network coverage, and further making loaded infotainment content available to rear seat passengers of the transportation vehicle;
wherein a section of the determined infotainment content corresponding to an extent of the area of insufficient network coverage is loaded,
wherein the determined infotainment content is played back without interference and interruption in the area of insufficient network coverage,
wherein the area of insufficient network coverage is determined based on a route used by the transportation vehicle, a map of network coverage, and a message relating to the network coverage received from at least one other transportation vehicle, and
wherein the loaded infotainment content available to the rear seat passengers is determined based on content regularly played to the rear seat passengers in the transportation vehicle according to a driving situation, the driving situation determined according to the transportation vehicle's location and estimated length of journey.

9. The method of claim 8, further comprising:
outputting a notification relating to the area of insufficient network coverage; and receiving the at least one user input in response to the notification.

10. The method of claim 9, wherein the notification has at least one input request to specify desired infotainment content and/or an indication of the extent of the area of insufficient network coverage.

11. The method of claim 8, wherein the at least one user input relates to the infotainment content provided in a current driving situation.

12. The method of claim 8, further comprising:
determining a current driving context of the transportation vehicle; and
loading the at least one user input from a database based on the determined driving context of the transportation vehicle.

* * * * *